S. W. Warren.
Steam Indicator.
No. 3,400
Reissued Apr. 27, 1869.
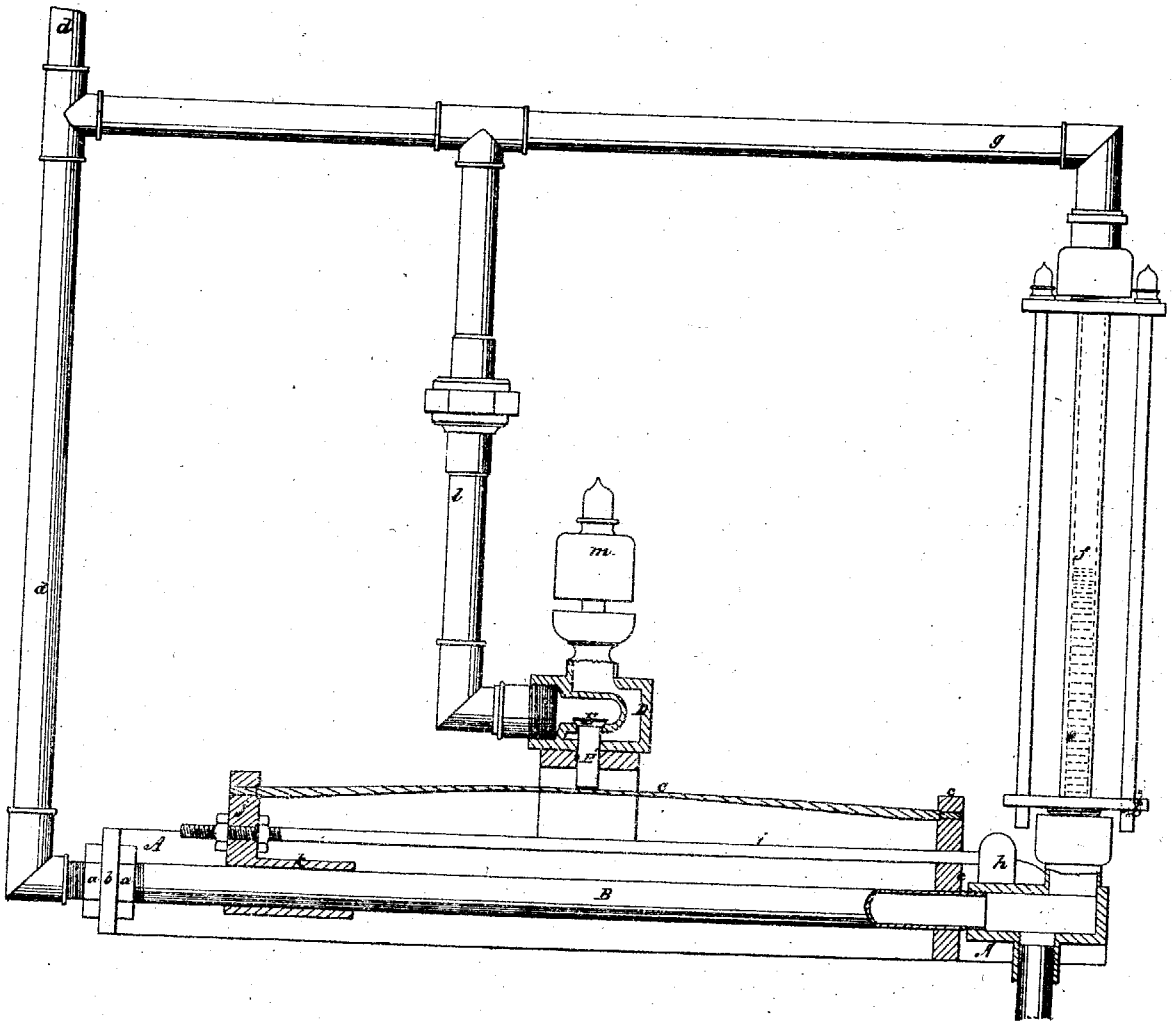

United States Patent Office.

HENRY MARTIN, OF WALLINGFORD, CONNECTICUT, ASSIGNEE, BY MESNE ASSIGNMENTS, OF SYLVESTER W. WARREN.

*Letters Patent No.* 20,835, *dated July* 6, 1858; *reissue No.* 3,400, *dated April* 27, 1869.

IMPROVEMENT IN STEAM-ALARM.

The Schedule referred to in these Letters Patent and making part of the same.

*To all whom it may concern:*

Be it known that SYLVESTER W. WARREN, of the city of Brooklyn, in the county of Kings, and State of New York, did invent certain new and improved Means of Operating the Valves of Alarm Water-Gauges, Safety-Valves, and Feeders for Steam-Boilers; and the following is hereby declared to be a full, clear, and exact description of the same, reference being had to the accompanying drawing, forming part of this specification, said drawing representing a front view, partly in section, of an alarm water-gauge with my invention applied.

Previous to this invention a metallic tube had been applied to a steam-boiler, and located so that it would remain full of water when the water in the boiler remained above a given level, but so that the water would pass out of said tube if the water descended below that level, and the expansion of the tube operated to give motion to a valve of a whistle or alarm. In these devices, however, difficulty existed in obtaining the necessary extent of movement, by the small motion resulting from the expansion of the tube.

The nature of this invention consisted in combining with the said expansive tube a valve-opener, with one end stationary and the other end connected with the tube, so as to be moved thereby, and the valve-opener occupying a bent position, the movement near the middle thereof is largely increased, so that the slight motion from the expanding tube is sufficient to reliably operate a valve or alarm.

A represents a plate, of metal, which is intended to be bolted to the wall of the engine-room, or other convenient place, at some distance from the boiler, the said plate having a small bracket, *b*, at or near one end, to which is secured rigidly, by nuts *a a*, one end of the horizontal metal tube B, the top of which is intended to be on a level with what is considered the lowest safe water-level in the boiler, and the said plate having, at or near its other end, a bracket, *c*, in which is an opening, through which the said tube is capable of working longitudinally, but in which it is supported and confined vertically and laterally.

The first-named end of the tube B is connected by a pipe, *d*, with the upper part or steam-chamber of the boiler, and the other end by a pipe, *e*, with the lower part of the boiler, and this pipe *e* may have connected with it the lower end of a glass tube, *f*, the upper end of which is connected by a pipe, *g*, with the steam-pipe *d*.

*h* represents a small upright post, or standard, secured firmly to the free end of the tube B, outside of the bracket *c*, of the plate A, and having attached securely to it a rod, *i*, which passes freely through an opening in the bracket *c*, and which is shown as attached securely to the arm *j* of a socket, *k*, that can slide freely upon the tube B, the said rod being nearly as long as the said tube, and occupying a position parallel therewith. The metal valve-opener C is applied between the parts *c* and *j*.

Above the centre of the valve-opener C is situated a valve-box, D, containing a valve, E, which is arranged to open and close a communication between a steam pipe, *l*, and the alarm or whistle *m*, the stem of which valve protrudes through an opening in the bottom of the box.

The operation of the alarm is as follows:

When the water in the boiler is at a proper level, the tube B is full, but, being placed at a sufficient distance from the connections to the boiler, there will be but little circulation in it, and the water within it will remain comparatively cool, and in that condition of the tube the valve-opener C will remain near, but will not act upon the valve-stem E′, and the valve E will be kept closed by the pressure of steam, but as soon as the level of the water in the boiler gets below the tube B, the water will run, by gravitation, from the said tube down the pipe *e*, and its place will be supplied by steam, which, being hotter than the water that has been contained by the tube, causes the tube to expand.

The movement of the tube being prevented in one direction by the nuts *a a*, the expansion moves the free end through the guide in the bracket *c*, and gives end-motion to one end of the valve-opener, and this being nearly in a straight line, the centre portion is moved considerably by a small movement at the end, so as to open the valve, and admitting the steam to the whistle or alarm.

A very considerable deflection of the valve-opener is produced by a very slight movement of its end, and hence a comparatively slight amount of expansion of the tube B beyond a certain point serves to give a wide opening to the valve.

When the tube B is again filled with water, it soon becomes cooler and contracts again, causing the valve-opener to come more nearly straight, and permitting the closing of the valve.

By the above description of the method of applying this invention to an alarm-gauge, an engineer of ordinary skill will be enabled to adapt it to feeders or safety-valves, it being only necessary to substitute for the whistle and valve E a valve in the feed-pipe, or a connection with a safety-valve.

What is claimed, and desired to be secured by Letters Patent, is—

1. An expansive metallic tube, combined with a valve-opener that is stationary at one end, and the other end is moved by the expansion of the tube, and produces an increased movement near the middle of the said valve-opener, substantially as set forth.

2. A horizontal expansive tube, connections to the steam and water-spaces of the boiler, and an alarm, in combination with a valve-opener, actuated by an endwise movement applied to one end of said valve-opener, to give an increased movement near the middle of said valve-opener, substantially as set forth.

Dated March 12, A. D. 1869.

HENRY MARTIN.

Witnesses:

GEO. D. WALKER,
CHAS. H. SMITH.